US012438649B2

(12) United States Patent
Fong et al.

(10) Patent No.: US 12,438,649 B2
(45) Date of Patent: Oct. 7, 2025

(54) SIDELINK IDENTIFICATION FOR MULTI-PATH DOWNLINK RETRANSMISSION

(71) Applicant: QUALCOMM Incorporated, San Diego, CA (US)

(72) Inventors: Lik Hang Silas Fong, Bridgewater, NJ (US); Hua Wang, Basking Ridge, NJ (US); Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/088,138

(22) Filed: Nov. 3, 2020

(65) Prior Publication Data

US 2021/0135796 A1    May 6, 2021

Related U.S. Application Data

(60) Provisional application No. 62/930,893, filed on Nov. 5, 2019.

(51) Int. Cl.
*H04L 1/18* (2023.01)
*H04L 1/1829* (2023.01)
*H04W 72/23* (2023.01)

(52) U.S. Cl.
CPC ........... *H04L 1/1854* (2013.01); *H04W 72/23* (2023.01)

(58) Field of Classification Search
CPC ........... H04L 1/1854; H04L 2001/0097; H04L 1/1887; H04L 1/1896; H04L 1/188; H04L 1/1819; H04W 72/042
See application file for complete search history.

(56) References Cited

U.S. PATENT DOCUMENTS 8,767,684 B2    7/2014  Chen et al.
11,659,551 B2*  5/2023  Cao ................... H04W 72/02
                                              370/330

(Continued)

FOREIGN PATENT DOCUMENTS

CN    101841823 A    9/2010
WO    2010138768    12/2010

(Continued)

OTHER PUBLICATIONS

Co-pending U.S. Appl. No. 16/998,687, inventor Wang; Hua, filed on Aug. 20, 2020.

(Continued)

*Primary Examiner* — John D Blanton
(74) *Attorney, Agent, or Firm* — Patterson & Sheridan LLP

(57) ABSTRACT

Certain aspects of the present disclosure provide techniques for sending a retransmission via a sidelink wireless communication channel. A method that may be performed by a first user equipment (UE) includes receiving, from a base station, a first data transmission. The method also includes receiving, from the base station, a signal indicating to retransmit at least a portion of the first data transmission to a second UE. The method further includes transmitting, to the second UE, based at least in part on the signal, a second data transmission via one or more resources, the second data transmission comprising at least the portion of the first data transmission.

30 Claims, 11 Drawing Sheets

(56) References Cited

U.S. PATENT DOCUMENTS

| | | | |
|---|---|---|---|
| 11,711,683 B2* | 7/2023 | Fakoorian | H04L 5/005 370/329 |
| 11,758,463 B2* | 9/2023 | Liao | H04W 8/005 370/315 |
| 2009/0262678 A1* | 10/2009 | Oyman | H04L 1/1867 370/315 |
| 2014/0126507 A1 | 5/2014 | Takahashi et al. | |
| 2017/0171841 A1 | 6/2017 | Chen et al. | |
| 2018/0035435 A1 | 2/2018 | Gupta et al. | |
| 2018/0091265 A1* | 3/2018 | Liu | H04L 1/08 |
| 2018/0279304 A1* | 9/2018 | Lee | H04L 5/0094 |
| 2019/0182827 A1* | 6/2019 | Wang | H04W 72/20 |
| 2019/0208539 A1* | 7/2019 | Christoffersson | H04L 1/0045 |
| 2019/0223206 A1* | 7/2019 | Gupta | H04L 5/0055 |
| 2020/0022174 A1* | 1/2020 | Karaki | H04W 72/0453 |
| 2020/0228194 A1* | 7/2020 | Hassan Hussein | H04L 1/1822 |
| 2021/0045093 A1* | 2/2021 | Rao | H04W 76/14 |
| 2021/0100001 A1* | 4/2021 | Höglund | H04L 5/0053 |
| 2021/0135796 A1* | 5/2021 | Fong | H04L 1/1819 |
| 2021/0136786 A1* | 5/2021 | Fong | H04W 72/535 |
| 2021/0194645 A1* | 6/2021 | Li | H04L 1/1845 |
| 2021/0219268 A1* | 7/2021 | Li | H04B 17/318 |
| 2021/0306824 A1* | 9/2021 | Li | H04W 72/02 |
| 2021/0321413 A1* | 10/2021 | Shin | H04W 72/23 |
| 2021/0345378 A1* | 11/2021 | Lu | H04L 1/1896 |
| 2022/0007403 A1* | 1/2022 | Li | H04W 72/20 |
| 2022/0053513 A1* | 2/2022 | Ryu | H04L 1/0025 |
| 2022/0116916 A1* | 4/2022 | Zhao | H04W 72/0453 |
| 2022/0150848 A1* | 5/2022 | Sun | H04W 52/281 |
| 2022/0158777 A1* | 5/2022 | Göktepe | H04L 1/1896 |
| 2022/0224457 A1* | 7/2022 | Ebrahim Rezagah | H04W 72/20 |
| 2022/0272742 A1* | 8/2022 | Xiang | H04L 5/0064 |
| 2022/0279451 A1* | 9/2022 | Yoshioka | H04W 52/245 |
| 2022/0295517 A1* | 9/2022 | Hahn | H04W 72/20 |
| 2022/0304001 A1* | 9/2022 | Lee | H04W 72/0446 |
| 2022/0329301 A1* | 10/2022 | Shin | H04W 72/02 |
| 2022/0330268 A1* | 10/2022 | Guo | H04L 1/1812 |
| 2022/0338232 A1* | 10/2022 | Cao | H04W 72/1263 |
| 2022/0400498 A1* | 12/2022 | Lee | H04W 72/11 |

FOREIGN PATENT DOCUMENTS

| | | |
|---|---|---|
| WO | 2019077194 A1 | 4/2019 |
| WO | 2019139936 A1 | 7/2019 |

OTHER PUBLICATIONS

Co-pending U.S. Appl. No. 17/087,974, inventor Wang; Hua, filed on Nov. 3, 2020.

International Search Report and Written Opinion—PCT/US2020/058909—ISA/EPO—Feb. 8, 2021.

* cited by examiner

SIDELINK IDENTIFICATION FOR MULTI-PATH DOWNLINK RETRANSMISSION

CROSS-REFERENCE TO RELATED APPLICATION

The present Application for Patent claims priority to U.S. Provisional Application No. 62/930,893, filed Nov. 5, 2019, which is hereby expressly incorporated by reference herein in its entirety.

INTRODUCTION

Aspects of the present disclosure relate to wireless communications, and more particularly, to techniques for sending a retransmission.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that provide desirable latencies and reliability in sending a retransmission to a wireless communication device.

Certain aspects provide a method for wireless communication by a first user equipment (UE). The method generally includes receiving, from a base station, a first data transmission. The method also includes receiving, from the base station, a signal indicating to retransmit at least a portion of the first data transmission to a second UE. The method further includes transmitting, to the second UE, based at least in part on the signal, a second data transmission via one or more resources, the second data transmission comprising at least the portion of the first data transmission.

Certain aspects provide a method for wireless communication by a second UE. The method generally includes receiving a signal indicating scheduling information for a data retransmission and receiving, from a first UE, the data retransmission via one or more resources.

Certain aspects provide a method for wireless communication by a base station. The method generally includes transmitting data to at least a first UE and a second UE and transmitting, to the first UE, a signal indicating to retransmit at least a portion of the data to the second UE, based on identifying that the second UE failed to successfully decode the data.

Certain aspects provide an apparatus for wireless communication. The apparatus generally includes a receiver configured to receive, from a base station, a first data transmission and receive, from the base station, a signal indicating to retransmit at least a portion of the first data transmission to a second UE. The apparatus also includes a transmitter configured to transmit, to the second UE, based at least in part on the signal, a second data transmission via one or more resources, the second data transmission comprising at least the portion of the first data transmission.

Certain aspects provide an apparatus for wireless communication. The apparatus generally includes a receiver configured to receive a signal indicating scheduling information for a data retransmission and receive, from a first UE, the data retransmission via one or more resources.

Certain aspects provide an apparatus for wireless communication. The apparatus generally includes a transmitter configured to transmit data to at least a first UE and a second UE and transmit, to the first UE, a signal indicating to retransmit at least a portion of the data to the second UE, based on identifying that the second UE failed to successfully decode the data.

Certain aspects provide an apparatus for wireless communication. The apparatus generally includes means for receiving, from a base station, a first data transmission. The apparatus also includes means for receiving, from the base station, a signal indicating to retransmit at least a portion of the first data transmission to a second UE. The apparatus further includes means for transmitting, to the second UE, based at least in part on the signal, a second data transmission via one or more resources, the second data transmission comprising at least the portion of the first data transmission.

Certain aspects provide an apparatus for wireless communication. The apparatus generally includes means for receiving a signal indicating scheduling information for a data retransmission and means for receiving, from a first UE, the data retransmission via one or more resources.

Certain aspects provide an apparatus for wireless communication. The apparatus generally includes means for transmitting data to at least a first UE and a second UE and means for transmitting, to the first UE, a signal indicating to retransmit at least a portion of the data to the second UE, based on identifying that the second UE failed to successfully decode the data.

Certain aspects provide a computer-readable medium having instructions stored thereon to cause a first UE to receive, from a base station, a first data transmission; receive, from the base station, a signal indicating to retransmit at least a portion of the first data transmission to a second UE; and transmit, to the second UE, based at least in part on the signal, a second data transmission via one or more resources, the second data transmission comprising at least the portion of the first data transmission.

Certain aspects provide a computer-readable medium having instructions stored thereon to cause a second UE to receive a signal indicating scheduling information for a data retransmission and receive, from a first UE, the data retransmission via one or more resources.

Certain aspects provide a computer-readable medium having instructions stored thereon to cause a base station to transmit data to at least a first UE and a second UE and transmit, to the first UE, a signal indicating to retransmit at least a portion of the data to the second UE, based on identifying that the second UE failed to successfully decode the data.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
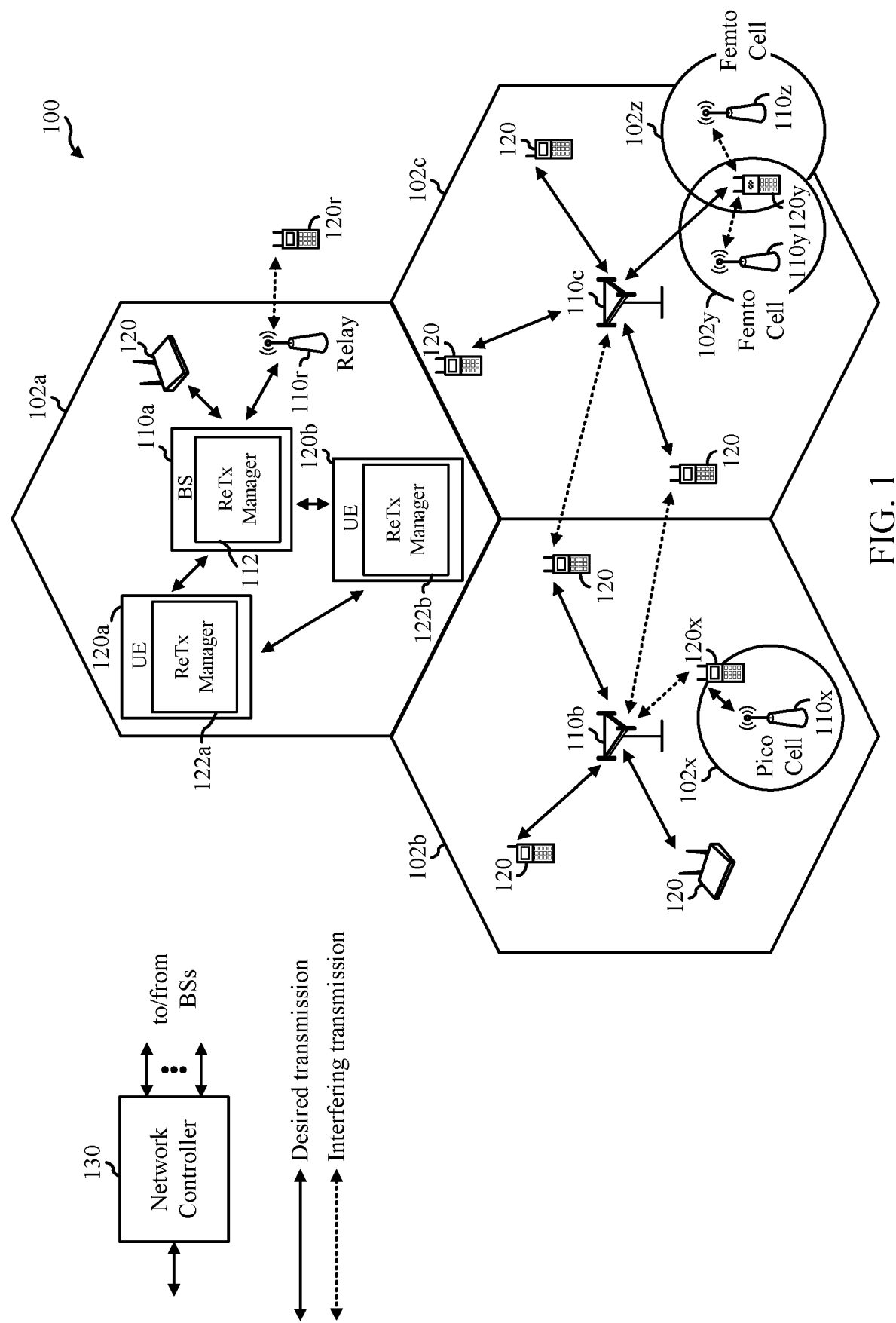
FIG. 1 is a block diagram conceptually illustrating an example telecommunications system, in accordance with certain aspects of the present disclosure.

Aspects of the present disclosure provide apparatus, methods, processing systems, and computer readable mediums for sending a downlink retransmission via a sidelink communication channel.

In certain wireless communication systems (e.g., 5G NR), low latency, high reliability applications, such as industrial internet-of-things (IIOT) systems, may suffer from degraded reliability when a direct link is blocked between a base station and an IIOT wireless device possibly due to moving machinery, and therefore causing radio link/beam failure or transmission failure (e.g., the IIOT wireless device fails to correctly decode a transmission). In certain cases, hybrid automatic repeat request (HARQ) retransmissions may continue to fail between the base station and the IIOT wireless device. In one aspect, the base station may reroute communications through a nearby sidelink device to the IIOT wireless device. However, establishing a relay path through the nearby sidelink device, upon detection of a radio link/beam failure or transmission failure, may introduce an unsuitable amount of latency, especially for low latency applications, such as IIOT systems.

Certain aspects of the present disclosure provide techniques for sending a retransmission from a base station to a first UE (e.g., a target UE) through a nearby second UE (e.g., a helper UE). In general, sidelink communications may include communications between two or more subordinate wireless communication devices (e.g., UEs 120) in a wireless communication network. In certain aspects, the base station may broadcast/multicast a downlink transmission intended for the target UE to a group of UEs, which are able to communicate with each other via sidelink communication channels. If the base station detects that the target UE failed to successfully decode the data transmission, the base station may trigger one or more helper UEs in the group of UEs to send a retransmission of the blocked data transmission to the target UE via a sidelink wireless communication channel, such as a physical sidelink shared channel (PSSCH). Such a scheme for transmitting retransmissions may provide desirable latencies and reliability in sending a retransmission to a wireless communication device.

The following description provides examples of wireless communications, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

A BS 110a includes a retransmission (ReTx) manager 112 that transmits data to first and second UEs 120a, 120b and transmits, to the first UE 120a, a signal indicating to retransmit at least a portion of the data to the second UE 120b, based on identifying that the second UE 120b failed to successfully decode the data, in accordance with aspects of the present disclosure.

A first UE 120a includes a retransmission manager 122a that receives, from the base station 110a, a first data transmission and receives, from the base station, a signal indicating to retransmit at least a portion of the first data transmission to the second UE 120b. The retransmission manager 122a of the first UE 120a also transmits, to the second UE 120b, based at least in part on the signal, a second data transmission via one or more resources, where the second data transmission comprises at least the portion of the first data transmission, in accordance with aspects of the present disclosure.

A second UE 120b includes a retransmission manager 122b that receives a signal indicating scheduling information for a data retransmission and receives, from the first UE 120a, the data retransmission via one or more resources, in accordance with aspects of the present disclosure.

NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
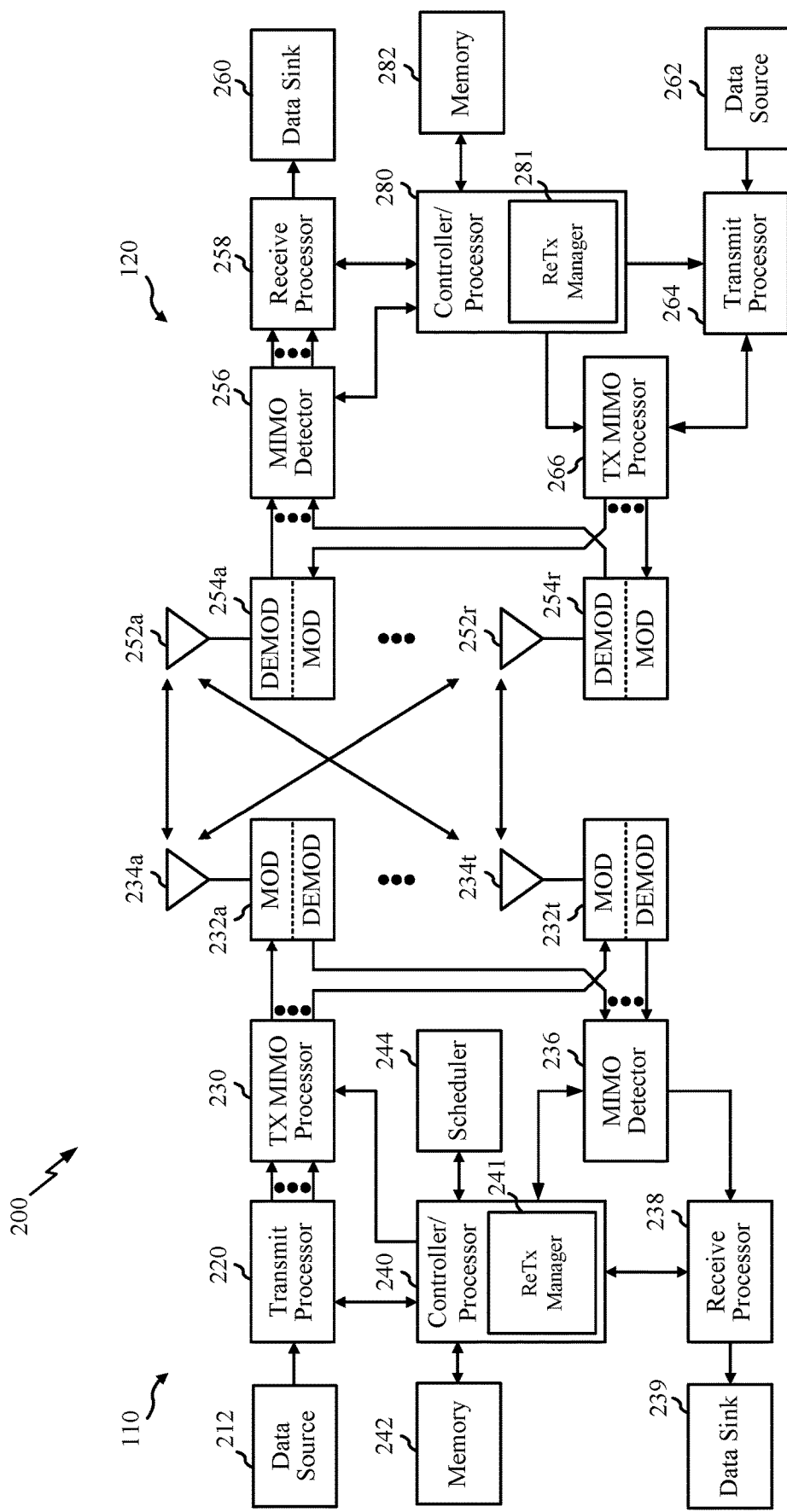
FIG. 2 is a block diagram conceptually illustrating a design of an example a base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and PBCH demodulation reference signal (DMRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for B S 110 and UE 120, respectively. A scheduler 244 may schedule UEs for data transmission on the downlink and/or uplink.

The controller/processor 280 and/or other processors and modules at the UE 120 may perform or direct the execution of processes for the techniques described herein.

The controller/processor 240 of the BS 110 has a retransmission manager 241 that transmits data to first and second UEs and transmits, to the first UE, a signal indicating to retransmit at least a portion of the data to the second UE, based on identifying that the second UE failed to successfully decode the data, according to aspects described herein.

In aspects, the controller/processor 280 of the UE 120 has a retransmission manager 281 that may receive, from the base station 110, a first data transmission and receive, from the base station, a signal indicating to retransmit at least a portion of the first data transmission to the second UE. The retransmission manager 281 may also transmit, to the second UE, based at least in part on the signal, a second data transmission via one or more resources, where the second data transmission comprises at least the portion of the first data transmission, according to aspects described herein.

In certain aspects, the retransmission manager 281 may also receive a signal indicating scheduling information for a data retransmission and receive, from the first UE, the data retransmission via one or more resources Although shown at the Controller/Processor, other components of the UE 120 and BS 110 may be used to perform the operations described herein.

While the UE 120a is described with respect to FIG. 2 as communicating with a BS and/or within a network, the UE 120a may be configured to communicate directly with/transmit directly to another UE (e.g., the UE 120b), or with/to another wireless communication device without relaying communications through a network. In some embodiments, the BS 110a illustrated in FIG. 2 and described above is an example of another UE.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link (or direct link). The access link may be provided via a Uu interface. Communication directly between devices may be referred to as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., UE 120b) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback including HARQ feedback and/or channel state feedback (CSF) related to a sidelink channel quality.

In some cases, sidelinks may be used to communicate with or among industrial Internet-of-Things (IIoT) systems.

IIOT wireless devices may enable machines to tell operators how to optimize productivity or detect a failure before it occurs, potentially saving companies billions of dollars a year. Use of sidelink in IIOT may reduce latency, provide multi-path diversity, extend coverage, improve battery-lifetime, provide location enhancement, and enable infrastructure-less communication.

Figure 3:
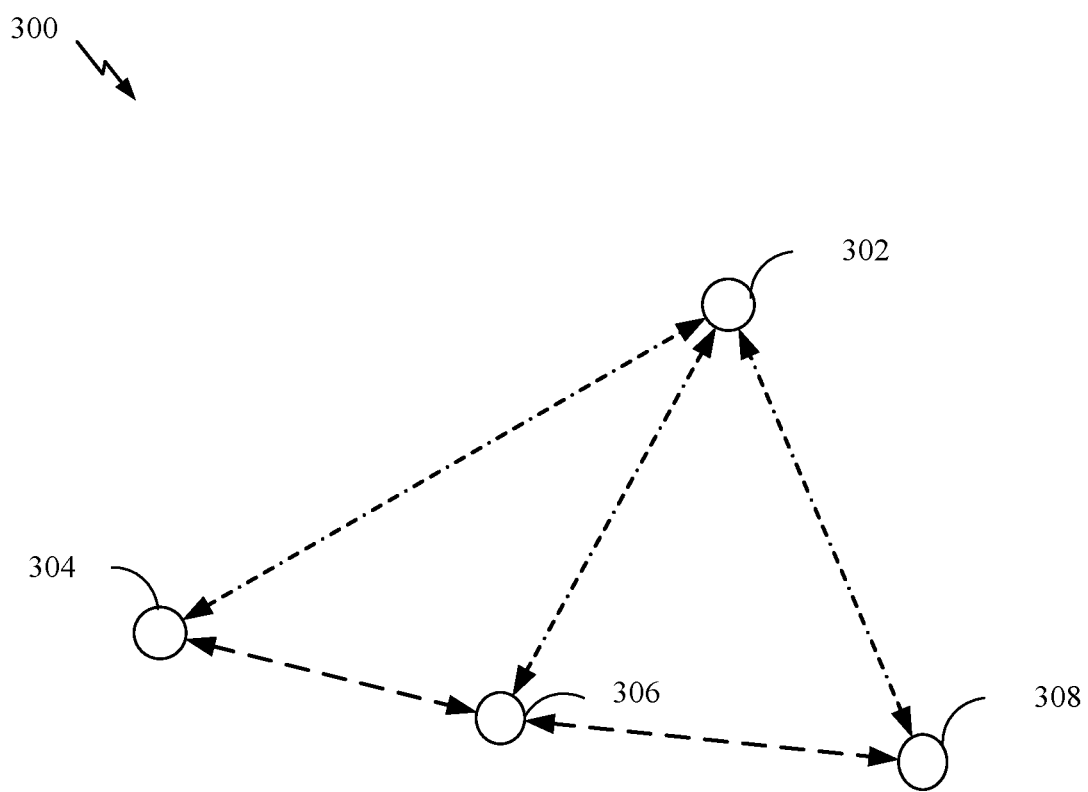
FIG. 3 is a diagram showing example access links and sidelinks, in accordance with certain aspects of the present disclosure.
Figure 4:
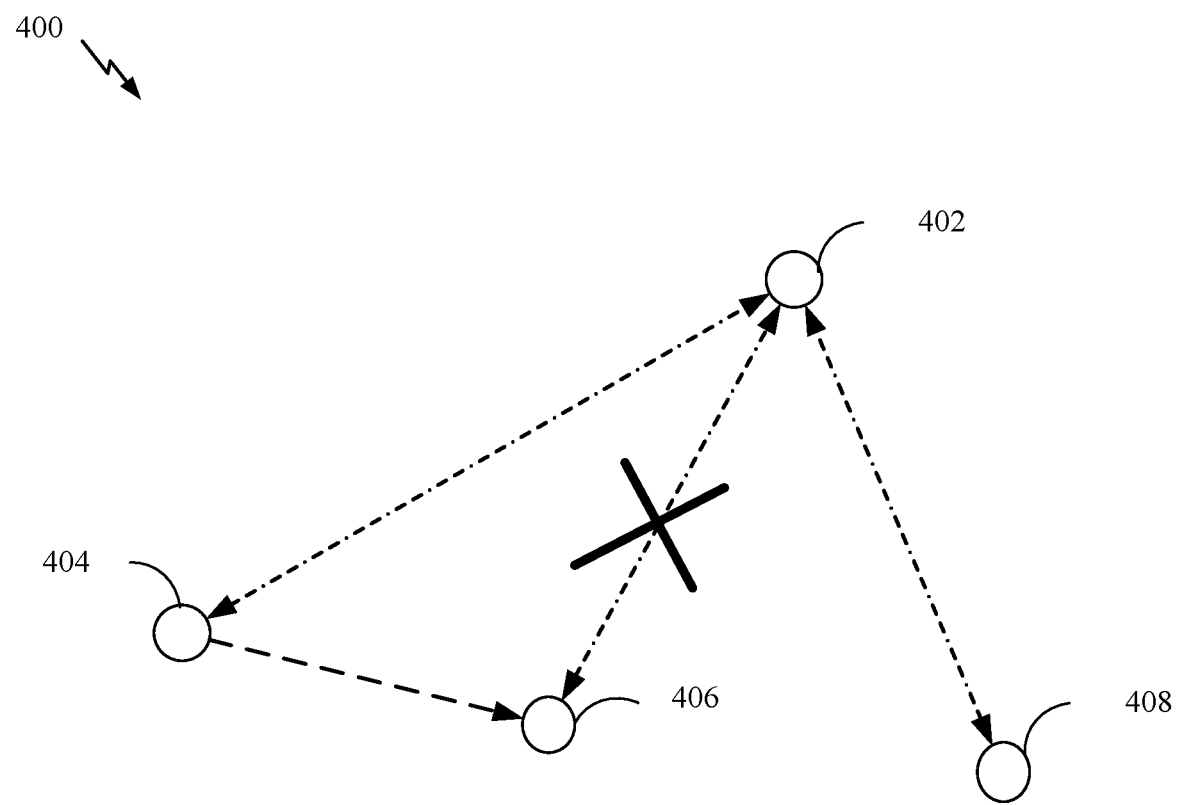
FIG. 4 is a diagram showing an example blocked access link, in accordance with certain aspects of the present disclosure.
Figure 5:
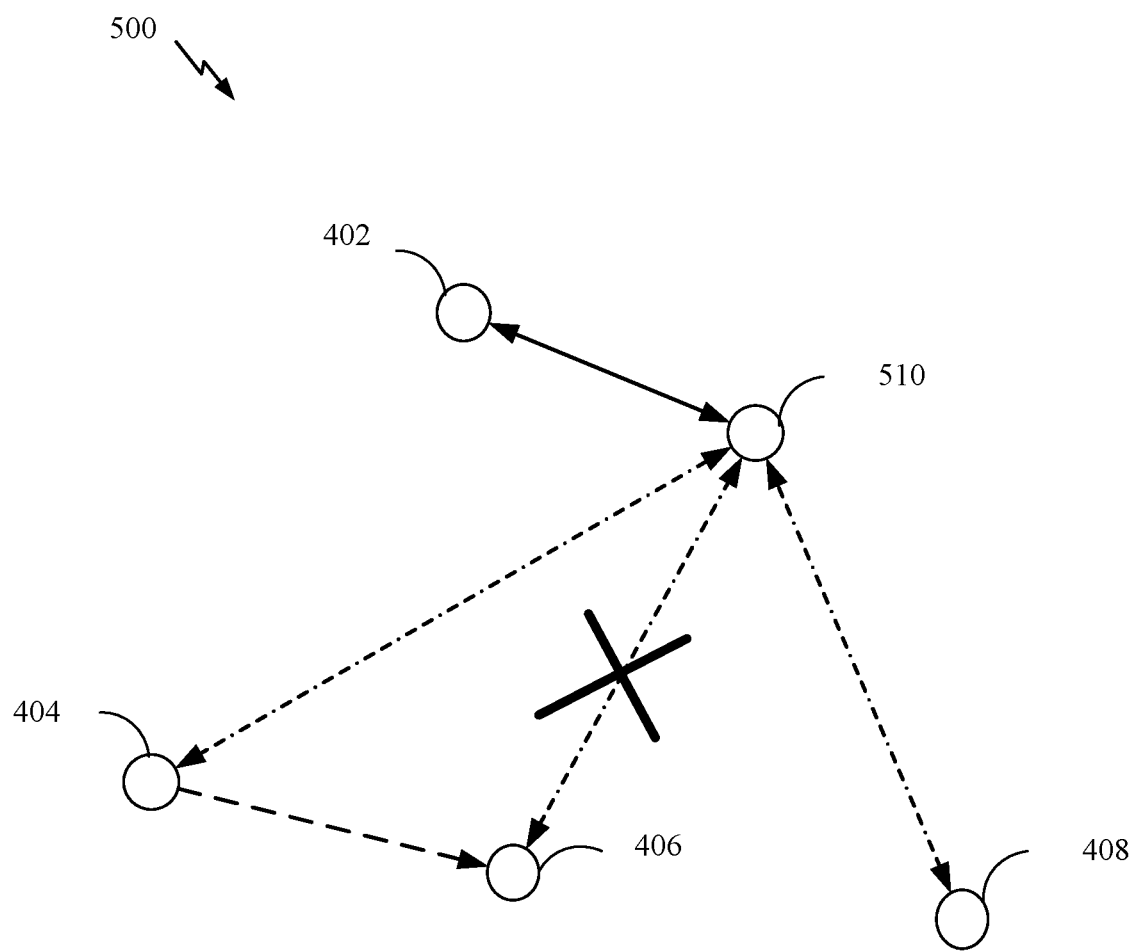
FIG. 5 is a diagram showing an example base station communicating through a programmable logical controller (PLC), in accordance with certain aspects of the present disclosure.

FIGS. 3, 4, and 5 are diagrams showing example access links and sidelinks, in accordance with certain aspects of the present disclosure. As shown in FIG. 3, an IIOT system 300 may include a base station 302 (such as a next generation NodeB (gNB)) and sidelink devices 304, 306, 308 (such as UEs, IIOT devices, and/or V2X devices). The base station 302 communicates with the sidelink devices 304, 306, 308 via direct links, and the sidelink devices 304, 306, 308 communicate directly with each other via sidelinks.

Referring to FIG. 4, a direct link between the base station 402 and a sidelink device 406 may be blocked in the IIOT system 400, and in certain cases, the sidelink device 404 may relay transmissions between the sidelink device 406 and the base station 402.

Referring to FIG. 5, a programmable logical controller (PLC) may be used in the IIOT system 500. For example, the station 402 in the IIOT system 500 communicates with a PLC 510 via a direct link, and the PLC 510 communicates with the sidelink devices 404, 406, 408 via sidelinks, as shown in FIG. 5. In other words, the base station 402 may communicate with the sidelink devices 404, 406, 408 through the PLC 510.

To increase path diversity, sidelink devices in the system (e.g., referred to herein as helper UEs) may retransmit the initial transmission from the base station or PLC to other sidelink devices in the system (e.g., referred to herein as target UEs), such as sidelink UEs that have a blocked link with the base station or PLC.

In some cases, the sidelink devices can perform sidelink channel signal quality measurements, such as reference signal receive power (RSRP) measurements, of pilot signals. The sidelink devices can report the sidelink channel measurements to the base station. Based on the reported measurements, the base station schedule transmissions between the sidelink devices and configure the sidelink devices into groups. For example, the base station can select the helper UEs and target UEs in a group of UEs.

Example Sidelink Identification for Multi-Path Downlink Retransmission

In certain wireless communication systems (e.g., 5G NR), low latency, high reliability applications, such as IIOT systems, may suffer from degraded reliability when a direct link is blocked between a base station and an IIOT wireless device (e.g., sidelink device 406) possibly due to moving machinery or interference, and therefore causing radio link/beam failure or transmission failure (e.g., the IIOT wireless device fails to correctly decode a transmission). In certain cases, HARQ retransmissions may continue to fail between the base station and the IIOT wireless device, and the base station may reroute communications through a nearby sidelink device (e.g., sidelink device 404) to the IIOT wireless device. However, establishing a relay path through the nearby sidelink device, upon detection of a radio link/beam failure or transmission failure, may introduce an unsuitable amount of latency, especially for low latency applications, such as IIOT systems.

Certain aspects of the present disclosure provide techniques for sending a retransmission from a base station to a first UE (e.g., a target UE or the sidelink device 406) through a nearby second UE (e.g., a helper UE or the sidelink device 404). In certain aspects, the base station may broadcast/multicast a downlink transmission intended for the target UE to a group of UEs, which are able to communicate with each other via sidelink transmissions. If the base station detects that the target UE failed to correctly decode the data transmission, the base station may trigger one or more helper UEs in the group of UEs to send a retransmission of the blocked data transmission to the target UE via a sidelink wireless communication channel, such as the PSSCH. Such a scheme for transmitting retransmissions may provide desirable latencies and reliability in sending a retransmission to a wireless communication device.

In certain IIOT systems, the traffic may be periodic (e.g., periodic requests/instructions and status updates), and traffic arrival times may be known. In certain cases, semi-persistent scheduling (SPS) may be used to multicast/broadcast data transmissions from the base station to the group of user equipment (UEs). Downlink transmissions may be configured using SPS, and each UE in a group of UEs may be assigned one or more helper UEs that have been SPS-configured to receive the corresponding downlink transmissions.

The helper UE(s) may store the multicast transmissions from the base station. The helper UE(s) may determine the target UE of each stored message by inspecting the SPS configuration, for example, a separate SPS group of UEs may be formed for each target UE. In response to receiving a control signal from the base station, the helper UE(s) may send the retransmission to the target UE through sidelink communication channels.

In aspects, the base station may transmit, to the helper UE(s) and/or target UE, a group PDCCH message to schedule the sidelink retransmission performed by the helper UEs. The group PDCCH message may include sidelink control messages associated with the sidelinks connected between the helper UE(s) and the respective target UE. The helper UE(s) may send, to the target UE, the retransmission via a PSSCH message. As the target UE may not receive the group PDCCH message, the helper UE(s) may transmit, to the target UE, a PSCCH message before transmitting the PSSCH message. The PSCCH message (e.g., sidelink control information (SCI)) may provide scheduling information, which may be partial or complete (implicit or explicit), for the PSSCH message including the sidelink retransmission.

Figure 6:
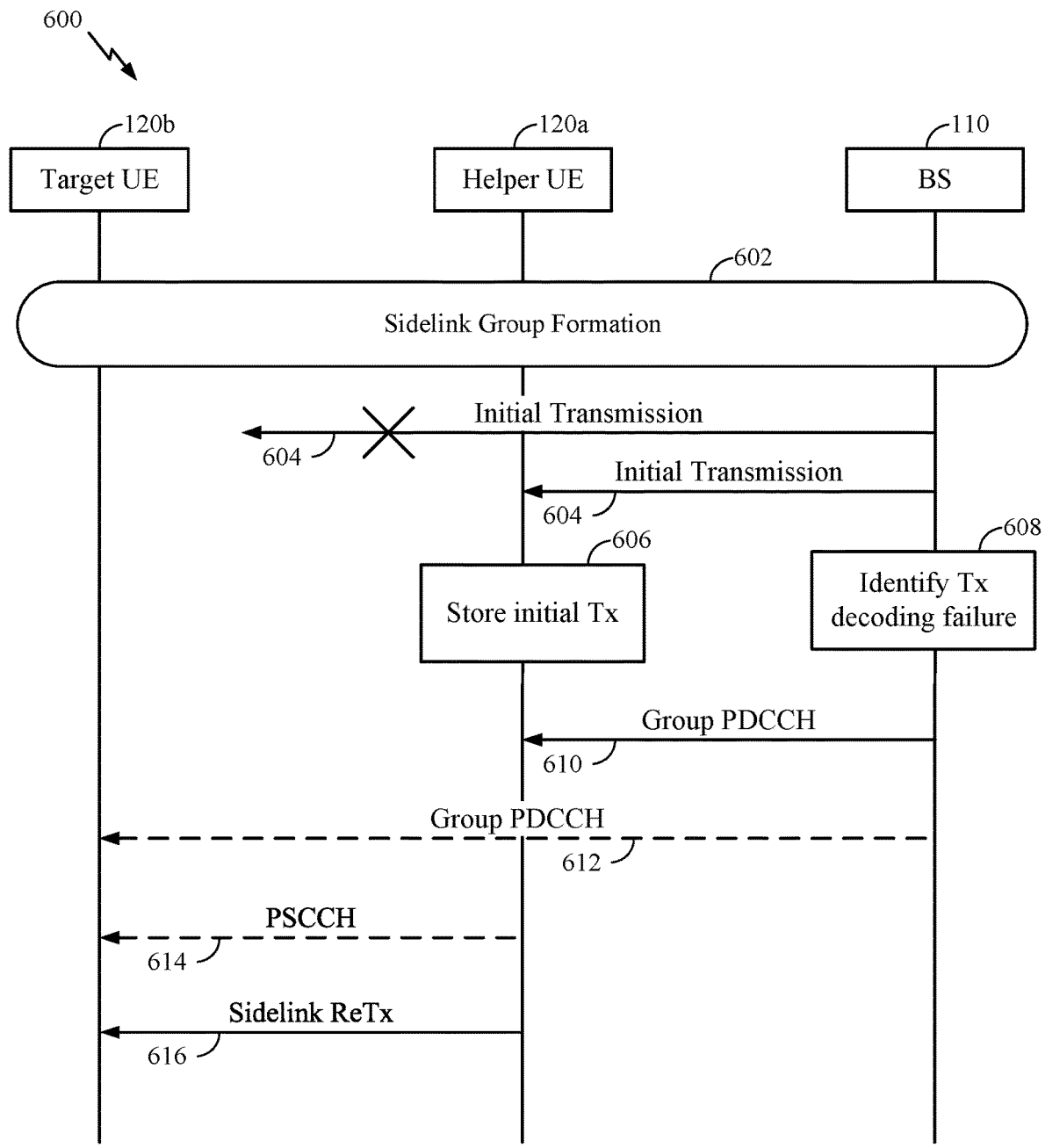
FIG. 6 is a call flow diagram illustrating example signaling for a sidelink retransmission, in accordance with aspects of the present disclosure.

FIG. 6 is a call flow diagram illustrating example operations for sending a retransmission via a sidelink communication channel, in accordance with certain aspects of the present disclosure. At 602, first and second UEs 120a, 120b may form a sidelink group either autonomously or as configured by the base station 110. The sidelink group may be used to enable a helper UE (e.g., the first UE 120a) to send a retransmission to a target UE (e.g., the second UE 120b), as further described herein. In certain cases, the sidelink group may be configured with SPS resources that are used for broadcast/multicast transmissions. At 604, the base station 110 may transmit an initial transmission, for example, via the configured SPS resources, to the sidelink group including the first and second UEs 120a, 120b. At 606, the first UE 120a may store the initial transmission in a buffer, for example, a HARQ buffer (such as a separate HARQ buffer for sidelink retransmissions). In aspects, the first UE 120a may store the initial transmission in response to receiving the initial transmission via the SPS resources. At 608, the base station 110 may identify that the second UE 120b (as the target UE of the initial transmission) failed to successfully decode the initial transmission, for example, via various HARQ operations. For example, the base station 110 may identify, after a certain time period, that the base station 110 has not received an acknowledgement (ACK) or a negative acknowledgement (NACK) from the second UE 120*b*, and based on the failure to receive HARQ feedback from the second UE 120*b*, the base station 110 may assume that the second UE 120*b* was not able to successfully decode the initial transmission.

At 610, based on the identification at 608, the base station 110 may transmit, to the first UE 120*a*, a group PDCCH message (e.g., downlink control information (DCI)) indicating to retransmit at least a portion of the initial transmission (such as a transport block (TB) or codeblock group (CBG)). The group PDCCH message may be scrambled with a group radio network temporary identifier (Group-RNTI) that allows the UEs in the sidelink group to decode the group PDCCH message. A Group-RNTI associated with a group of UEs configured to communicate with each other via sidelink channels may be referred to herein as a Group-sidelink-RNTI (G-SL-RNTI). For example, the sidelink group may be configured with a G-SL-RNTI that facilitates broadcast/multicast transmissions to the sidelink group. The G-SL-RNTI may be associated with one or more target UEs and one or more helper UEs, which may use the G-SL-RNTI to identify the target UEs. That is, in some cases, the G-SL-RNTI may be specific to the target UE, and the helper UE(s) may identify a buffered initial transmission intended for the target UE based on the G-SL-RNTI.

The group PDCCH message may indicate various parameters including a UE identifier (ID) of the helper UE that transmits the sidelink retransmission, a resource allocation indicating the resources for the sidelink retransmission, a modulation and coding scheme (MCS) for the sidelink retransmission, a redundancy version (RV) for the sidelink retransmission, a power control command for the sidelink retransmission, a HARQ process number associated with the retransmission, or a combination thereof.

The UE ID in the group PDCCH message may specify the helper UE that transmits the sidelink retransmission. For instance, each of the UEs in the sidelink group may be configured with a unique UE ID (e.g., a UE specific RNTI such as the Cell RNTI (C-RNTI)), and the UE ID in the group PDCCH message may specify the retransmitting helper UE within the sidelink group configured with the G-SL-RNTI.

In certain aspects, the group PDCCH message may also be transmitted to the second UE 120*b*. For instance, the base station 110 may broadcast/multicast the transmission of the group PDCCH message at 610 and 612, and in some cases, concurrently. In certain cases, the base station 110 may adjust the redundancy version of the group PDCCH message to enable successful decoding at the second UE 120*b*. The second UE 120*b* may determine the resources for the scheduled sidelink transmission based on the group PDCCH message. That is, the group PDCCH message may provide a scheduling grant for the sidelink transmission from the first UE 120*a*.

In aspects, at 614, the first UE 120*a* may transmit, to the second UE 120*b*, a control message (e.g., an SCI via a PSCCH) indicating scheduling information, which may be partial or complete (implicit or explicit), for the retransmission. As a direct link between the second UE 120*b* and the base station 110*a* may be blocked for various reasons (e.g., due to physical blockage and/or interference), the control message from the first UE 120*a* may provide a reliable means for scheduling the sidelink transmission. In certain aspects, the scheduling information may be autonomously configured by the first UE 120*a*, or in other aspects, the scheduling information may be centrally controlled by the base station 110 based on the resources indicated in the group PDCCH message received at 608. The control message may indicate various parameters including a sidelink identifier (ID) associated with the sidelink retransmission, a resource allocation indicating the resources for the sidelink retransmission, a MCS for the sidelink retransmission, a RV for the sidelink retransmission, a power control command for the sidelink retransmission, a HARQ process number associated with the retransmission, or a combination thereof.

At 616, the first UE 120*a* may identify the data (e.g., one or more transport blocks) scheduled for retransmission based on the group PDCCH message (e.g., the G-SL-RNTI associated with the target UE), retrieve that data from the buffer, and transmit to the second UE 120*b*, a retransmission of the initial transmission, for example, via a PSSCH. In certain cases, the first UE 120*a* may transmit, to the second UE 120*b*, additional retransmissions, until the data is successfully decoded at the second UE 120*b*, or a maximum number of retransmissions of the data has occurred, or some other termination condition is encountered, for example, according to separate HARQ operations at the first UE 120*a*. With such a retransmission scheme, the second UE 120*b* may receive the retransmission in a shorter amount of time than it may take for the base station 110 to proceed with certain HARQ operations on the direct link between the base station 110 and the second UE 120*b*. For example, under certain HARQ operations, the base station 110 may attempt to send retransmissions with incremental redundancy (e.g., redundancy bits) on the direct link, where each retransmission increases the amount of redundancy included. In other words, using a sidelink path for retransmissions may facilitate lower redundancy and improved reliability in wireless communications.

The sidelink ID of the PSCCH message may enable the target UE to identify the sidelink retransmission transmitted by the helper UE on the PSSCH. For instance, the sidelink retransmission at 616 may be configured with the same sidelink ID indicated in the PSCCH message at 614, and upon decoding the retransmission, the target UE may verify whether the sidelink ID of the retransmission matches the sidelink ID received in the PSCCH.

In certain aspects, the sidelink ID may be specific to the target UE. Each UE may be configured with a unique sidelink ID (e.g., C-RNTI), and the sidelink ID may correspond to the ID of the target UE. For instance, every sidelink retransmission destined for the same target UE is configured with the same sidelink ID. A target-UE specific sidelink ID may be suitable for scenarios where a target UE is blocked from receiving group PDCCH messages and the target UE expects to identify, from the PSCCH message, the subsequent PSSCH message.

In other aspects, the sidelink ID may be specific to the sidelink transmission. That is, each sidelink retransmission has a unique ID. Such a sidelink ID may use a larger ID space compared to UE-specific IDs. A transmission specific sidelink ID may be suitable where a target UE is blocked from receiving the group PDCCH message, and the target UE expects to identify, from PSCCH message, the exact transmitter(s) of the subsequent PSSCH messages.

In aspects, the sidelink ID may be specific to the helper UE. Each UE may be configured with a unique sidelink ID (e.g., C-RNTI), and the sidelink ID may correspond to the ID of the helper UE. For instance, every sidelink retransmission sent by the same helper UE is configured with the same sidelink ID. A helper UE specific sidelink ID may be suitable for scenarios where each helper UE is assigned a single target UE. If a target UE is blocked from receiving group PDCCH messages, the target UE may still identify, from the PSCCH, the unique transmitter of the subsequent PSSCH message.

While the examples depicted in FIG. 6 are described herein with respect to triggering a retransmission of an initial transmission (e.g., new data) to facilitate understanding, aspects of the present disclosure may also be applied to a base station triggering a helper UE to transmit subsequent retransmissions to the target UE.

Figure 7:
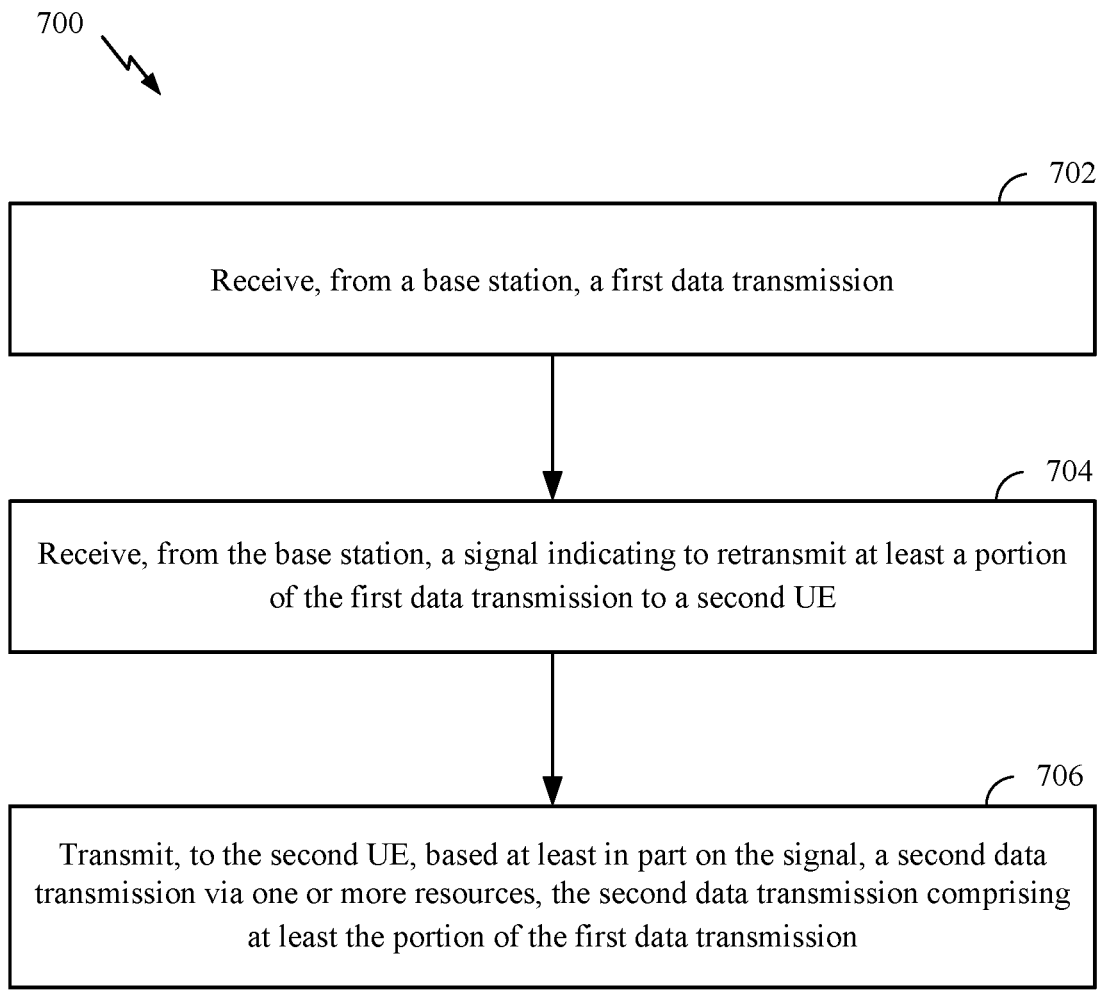
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., the UE 120a or the UE 120b). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin at 702, where a first UE (e.g., the first UE 120a) receives, from a base station (e.g., the BS 110), a first data transmission (e.g., one or more transport blocks and/or one or more codeblock groups). At 704, the first UE receives, from the base station, a signal (e.g., a group PDCCH message such as a DCI message) indicating to retransmit at least a portion of the first data transmission to a second UE (e.g., the second UE 120b). At 706, the first UE transmits, to the second UE, based at least in part on the signal, a second data transmission via one or more resources, where the second data transmission comprises at least the portion of the first data transmission (e.g., the transport blocks or codeblock groups).

In certain aspects, the base station may broadcast/multicast a control signal, which schedules the sidelink retransmission, to a group of sidelink devices such as the first UE and/or the second UE. For example, the signal received at 704 may include a group PDCCH message for a group of UEs including the first UE and/or the second UE. For instance, the signal may be scrambled with a Group-RNTI (e.g., a G-SL-RNTI) associated with the group of UEs including the first UE and/or the second UE. The group of UEs may be formed as a sidelink group that is capable of communicating with each other via sidelink communication channels. The operations 700 may further include the first UE decoding the signal based on the Group-RNTI.

The signal at 704 may include a DCI message with various parameters for scheduling the sidelink retransmission to the target UE (e.g., the second UE of the operations 700). For example, the signal at 704 may further indicate at least one of a UE ID of the helper UE (e.g., the first UE of the operations 700) scheduled to transmit the sidelink retransmission (e.g., the second data transmission), a resource allocation (e.g., a frequency-domain resource assignment and/or a time-domain resource assignment) indicating the one or more resources assigned for the for the sidelink retransmission, an MCS for the sidelink retransmission, an RV for the sidelink retransmission, a power control command (e.g., a transmit power command) for the sidelink retransmission, a HARQ process number associated with the retransmission, or a combination thereof.

In certain aspects, the base station may centrally control the resource assignment for sidelink transmissions. That is, the base station may schedule the resource assignment for the sidelink transmission via a control message, such as the signal at 704. For instance, the signal at 704 may include a resource allocation (e.g., a frequency domain resource assignment and/or a time-domain resource assignment) indicating the one or more resources used for the sidelink retransmission.

In other aspects, the sidelink devices (e.g., the first UE and second UE of the operations 700) may autonomously configure the resources used for sidelink transmissions. For example, the operations 700 may further include the first UE configuring the one or more resources (e.g., frequency domain resources and/or a time-domain resources) for the second data transmission. That is, the first UE may identify resources available for sidelink transmission, for example based on a channel assessment and/or feedback from other sidelink devices, and use the identified resources for the sidelink retransmission.

According to certain aspects, the helper UE may transmit a control message that indicates scheduling information for the sidelink retransmission. In aspects, the scheduling information may be implicitly or explicitly indicated. In certain aspects, the scheduling information may be partial or complete scheduling information. For example, partial scheduling information may indicate time-domain resources for the sidelink retransmission, and complete scheduling information may indicate time-domain resources and frequency-domain resources for the sidelink retransmission. The scheduling information may indicate a scheduling offset relative to time-domain resources in which the control message is received. As a direct link between the second UE and the base station may be blocked for various reasons (e.g., due to physical blockage and/or interference), the control message from the helper UE may provide a reliable means for scheduling the sidelink transmission. As an example, the operations 700 may further include the first UE transmitting, to the second UE, a control message indicating scheduling information for the second data transmission. In aspects, the first UE may transmit the control message via a PSCCH.

The control message from the helper UE may include a SCI message with various parameters for scheduling the sidelink retransmission to the target UE (e.g., the second UE of the operations 700). For example, the control message may further indicate at least one of: a sidelink ID associated with the sidelink retransmission (e.g., the second data transmission), a resource allocation (e.g., a frequency domain resource assignment and/or a time-domain resource assignment) indicating the one or more resources for the sidelink retransmission, an MCS for the for the sidelink retransmission, an RV for the sidelink retransmission, a power control command for the sidelink retransmission, a HARQ process number associated with the retransmission, or a combination thereof. In aspects, the sidelink ID may be specific to the target UE (e.g., the second UE), a sidelink transmission, or the helper UE (e.g., the first UE).

In aspects, the group of helper UE(s) and target UE(s) may be configured with SPS resources that are used for broadcast/multicast transmissions. In certain cases, the downlink traffic flow to the target UE may be periodic. SPS may be used to schedule resources (e.g., frequency domain resources and/or time-domain resources) on a periodic basis without using a scheduling grant for each transmission. The base station may configure the helper UEs with a SPS resource grant to receive multicast transmissions intended for the target UE on a periodic basis. The SPS configuration may enable the helper UEs to buffer the transmissions intended for the target UE and send a sidelink retransmission upon receiving a control message from the base station. For instance, the first UE may receive the first data transmission, at 702, according to a configuration of one or more SPS resources for the group of UEs including the first UE and/or the second UE. The first UE may store the first data transmission in response to receiving the first data transmission via the SPS resources. That is, the first UE may identify that the first data transmission is intended for the second UE based on receiving the first data transmission via the SPS resources, and the first UE may store the first data transmission in a buffer, such as a HARQ buffer, for sidelink retransmissions to the second UE.

Figure 8:
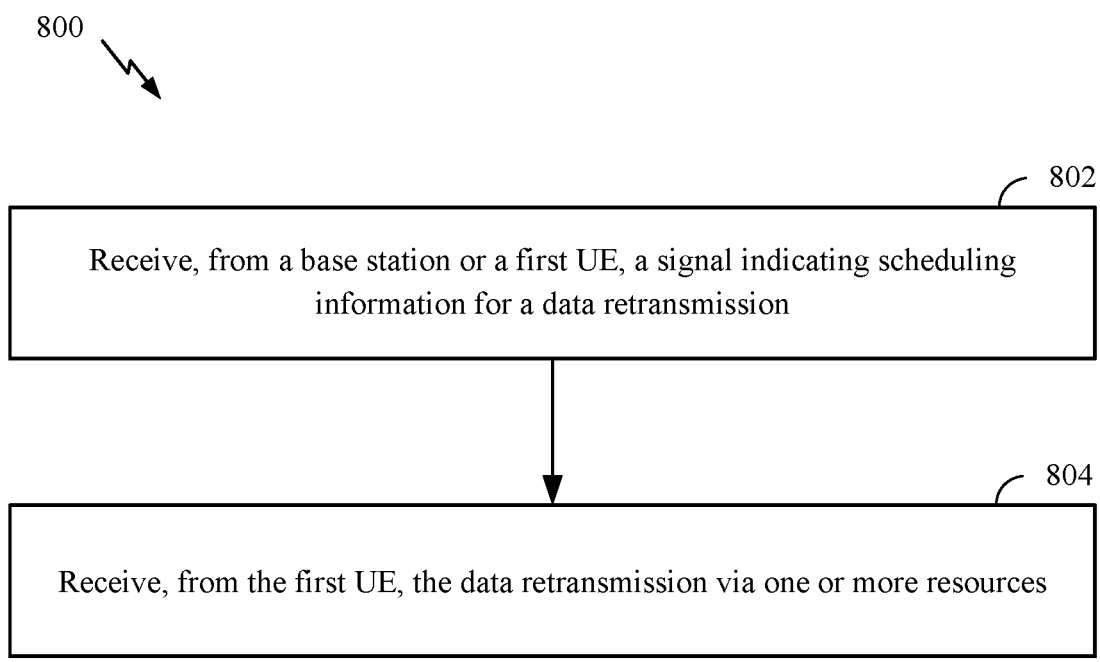
FIG. 8 is a flow diagram illustrating example operations for wireless communication by another UE, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., the UE 120a and/or the UE 120b). The operations 800 may be complimentary to the operations 700 performed by the helper UE. The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin at 802, where a second UE (e.g., the second UE 120b) receives a signal indicating scheduling information for a data retransmission (e.g., the sidelink retransmission). At 804, the second UE receives, from a first UE (e.g., the first UE 120a), the data retransmission via one or more resources.

In certain aspects, the base station may broadcast/multicast a control signal, which schedules the sidelink retransmission, to a group of sidelink devices such as the first UE and/or the second UE. For example, at 802, the second UE may receive the signal, from a base station, via a group PDCCH message for a group of UEs including the second UE and/or the first UE. For instance, the signal may be scrambled with a Group-RNTI (e.g., a G-SL-RNTI) associated with the group of UEs including the first UE and/or the second UE. The group of UEs may be formed as a sidelink group that is capable of communicating with each other via sidelink communication channels. The operations 800 may further include the second UE decoding the signal based on the Group-RNTI.

The signal at 802 may include a DCI message with various parameters for scheduling the sidelink retransmission to the target UE (e.g., the second UE of the operations 800). As an example, the signal at 802 may further indicate at least one of a UE ID of the helper UE (e.g., the first UE of the operations 700) scheduled to transmit the sidelink retransmission (e.g., the data retransmission), a resource allocation (e.g., a frequency domain resource assignment and/or a time-domain resource assignment) indicating the one or more resources assigned for the for the sidelink retransmission, an MCS for the sidelink retransmission, an RV for the sidelink retransmission, a power control command (e.g., a transmit power command) for the sidelink retransmission, a HARQ process number associated with the retransmission, or a combination thereof.

In certain aspects, the base station may centrally control the resource assignment for sidelink transmissions. That is, the base station may schedule the resource assignment for a sidelink transmission via a control message, such as the signal at 802. For instance, the signal at 802 may include a resource allocation (e.g., a frequency domain resource assignment and/or a time-domain resource assignment) indicating the one or more resources used for the sidelink retransmission.

According to certain aspects, the target UE may receive, from the helper UE, a control message that schedules the sidelink retransmission. In aspects, the scheduling information may be implicitly or explicitly indicated. In certain aspects, the scheduling information may be partial or complete scheduling information. For example, partial scheduling information may indicate time-domain resources for the sidelink retransmission, and complete scheduling information may indicate time-domain resources and frequency-domain resources for the sidelink retransmission. The scheduling information may indicate a scheduling offset relative to time-domain resources in which the control message is received. As a direct link between the second UE and the base station may be blocked for various reasons (e.g., due to physical blockage and/or interference), the control message from the helper UE may provide a reliable means for scheduling the sidelink transmission. For example, at 802, the second UE may receive the signal, from the first UE, via a PSCCH.

The control message from the helper UE may include an SCI message with various parameters for scheduling the sidelink retransmission to the target UE (e.g., the second UE of the operations 800). For example, the control message may further indicate at least one of: a sidelink ID associated with the sidelink retransmission (e.g., the data retransmission), a resource allocation (e.g., a frequency domain resource assignment and/or a time-domain resource assignment) indicating the one or more resources for the sidelink retransmission, an MCS for the for the sidelink retransmission, an RV for the sidelink retransmission, a power control command for the sidelink retransmission, a HARQ process number associated with the retransmission, or a combination thereof. In aspects, the sidelink ID may be specific to the target UE (e.g., the second UE), a sidelink transmission, or the helper UE (e.g., the first UE).

In aspects, the group of helper UE(s) and target UE(s) may be configured with SPS resources that are used for broadcast/multicast transmissions. As an example, the second UE may receive, from the base station, a first data transmission according to a configuration of one or more SPS resources for a group of UEs including the first UE and/or the second UE. As the channel conditions between the base station and second UE may be poor due to various reasons, the second UE may fail to decode the first data transmission, and in some cases, the second UE may store the first data transmission in a HARQ buffer according to various HARQ operations (e.g., soft combining HARQ schemes). In aspects, the data retransmission at 804 may be a retransmission of the first data transmission via a PSSCH. The second UE may use the HARQ process number to perform various HARQ operations on the first data transmission, such as soft combining.

Figure 9:
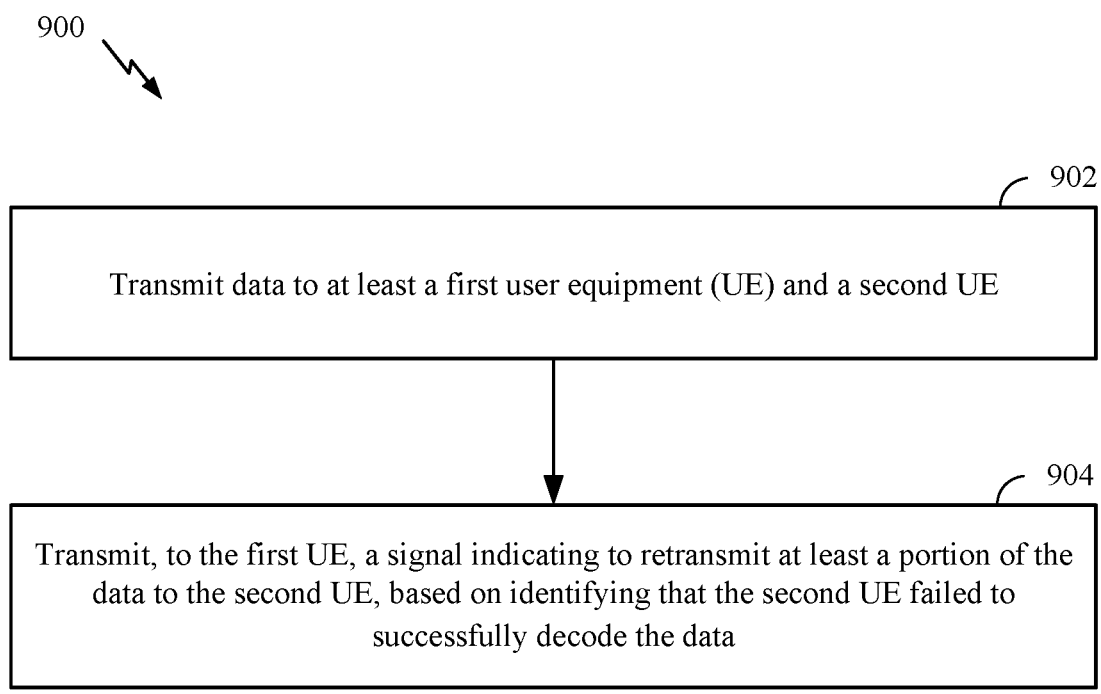
FIG. 9 is a flow diagram illustrating example operations for wireless communication by a BS, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., the BS 110a). The operations 900 may be complimentary to the operations 700 performed by the helper UE and/or 800 performed by the target UE. The operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin at 902, where a base station transmits data (e.g., one or more transport blocks) to at least a first UE (e.g., the first UE 120a) and a second UE (e.g., the second UE 120b). At 904, the base station transmits, to the first UE, a signal indicating to retransmit at least a portion of the data to the second UE, based on identifying that the second UE failed to successfully decode the data.

In aspects, the group of helper UE(s) and target UE(s) may be configured with SPS resources that are used for broadcast/multicast transmissions. In certain cases, the downlink traffic flow to the target UE may be periodic. SPS may be used to schedule resources (e.g., frequency domain resources and/or time-domain resources) on a periodic basis without using a scheduling grant for each transmission. The base station may configure the helper UEs with a SPS resource grant to receive multicast transmissions intended for the target UE on a periodic basis. The SPS configuration enables the helper UEs to buffer the transmissions intended for the target UE and send a sidelink retransmission upon receiving a control message from the base station. For instance at 802, the base station may transmit the data according to a configuration of one or more SPS resources for a group of UEs including the first UE and the second UE. That is, the base station may concurrently multicast/broadcast the data according to an SPS configuration.

In certain aspects, the base station may broadcast/multicast a control signal, which schedules the sidelink retransmission, to a group of sidelink devices such as the first UE and/or the second UE. For example, the signal received at 904 may include a group PDCCH message for a group of UEs including the first UE and/or the second UE. The signal may be scrambled with a Group-RNTI (e.g., a G-SL-RNTI) associated with the group of UEs including the first UE and/or the second UE. The operations 900 may further include the base station scrambling the signal based on the Group-RNTI associated with the group of UEs including the first UE and/or the second UE. The group of UEs may be formed as a sidelink group that is capable of communicating with each other via sidelink communication channels.

The signal at 804 may include a DCI message with various parameters for scheduling the sidelink retransmission to the target UE (e.g., the second UE of the operations 900). For example, the signal at 904 may further indicate at least one of a UE ID of the helper UE (e.g., the first UE of the operations 900) scheduled to transmit the sidelink retransmission (e.g., the scheduled data retransmission), a resource allocation (e.g., a frequency domain resource assignment and/or a time-domain resource assignment) indicating the one or more resources assigned for the for the sidelink retransmission, an MCS for the sidelink retransmission, an RV for the sidelink retransmission, a power control command (e.g., a transmit power command) for the sidelink retransmission, a HARQ process number associated with the retransmission, or a combination thereof.

In aspects, the base station may identify that the second UE failed to successfully decode the data based on various HARQ operations. For example, the base station may identify, after a certain time period, that the base station has not received HARQ feedback (e.g., an ACK or NACK) from the second UE, and based on the failure to receive HARQ feedback from the second UE, the base station may assume that the second UE 120b was not able to successfully decode the initial transmission.

Figure 10:
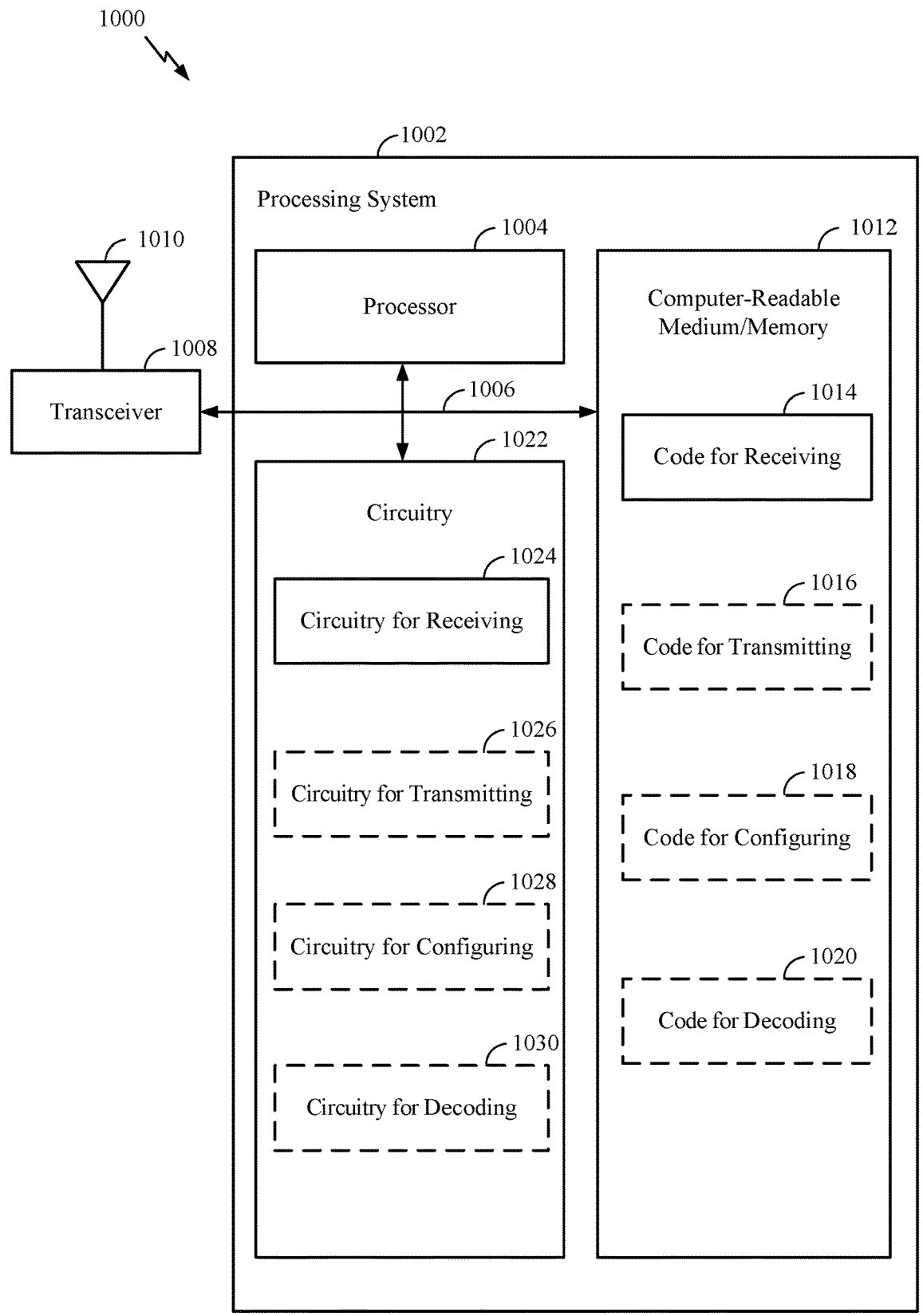
FIG. 10 illustrates a communications device (e.g., a UE) that may include various components configured to perform operations for the techniques disclosed herein in accordance with aspects of the present disclosure.

FIG. 10 illustrates a communications device 1000 (e.g., the UE 120a and/or the UE 120b) that may include various components (e.g., corresponding to means-plus-function components) configured to perform operations for the techniques disclosed herein, such as the operations illustrated in FIG. 7 and/or FIG. 8. The communications device 1000 includes a processing system 1002 coupled to a transceiver 1008 (e.g., a transmitter and/or receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7 and/or FIG. 8, or other operations for performing the various techniques discussed herein for transmitting/receiving sidelink retransmissions. In certain aspects, computer-readable medium/memory 1012 stores code for receiving 1014, code for transmitting 1016, code for configuration 1018, and/or code for decoding 1020. In certain aspects, the processing system 1002 has circuitry 1022 configured to implement the code stored in the computer-readable medium/memory 1012. In certain aspects, the circuitry 1022 is coupled to the processor 1004 and/or the computer-readable medium/memory 1012 via the bus 1006. For example, the circuitry 1022 includes circuitry for receiving 1024, circuitry for transmitting 1026, circuitry for configuring 1028, and/or circuitry for decoding 1030.

Means for receiving may comprise an antenna (e.g., the antennas 252a-252r), a transceiver (e.g., the transceivers 254a-254r), a processor (e.g., the controller/processor 280), and/or circuitry for receiving (e.g., the circuitry for receiving 1024). Means for transmitting may comprise an antenna (e.g., the antennas 252a-252r), a transceiver (e.g., the transceivers 254a-254r), a processor (e.g., the controller/processor 280), and/or circuitry for transmitting (e.g., the circuitry for transmitting 1026). Means for configuring may comprise an antenna (e.g., the antennas 252a-252r), a transceiver (e.g., the transceivers 254a-254r), a processor (e.g., the controller/processor 280), and/or circuitry for configuring (e.g., the circuitry for configuring 1028). Means for decoding may comprise an antenna (e.g., the antennas 252a-252r), a transceiver (e.g., the transceivers 254a-254r), a processor (e.g., the controller/processor 280), and/or circuitry for decoding (e.g., the circuitry for decoding 1030). In certain aspects, various processors and/or various circuitry may include a circuit, a central processing unit (CPU), a graphics processing unit (GPU), a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein.

Figure 11:
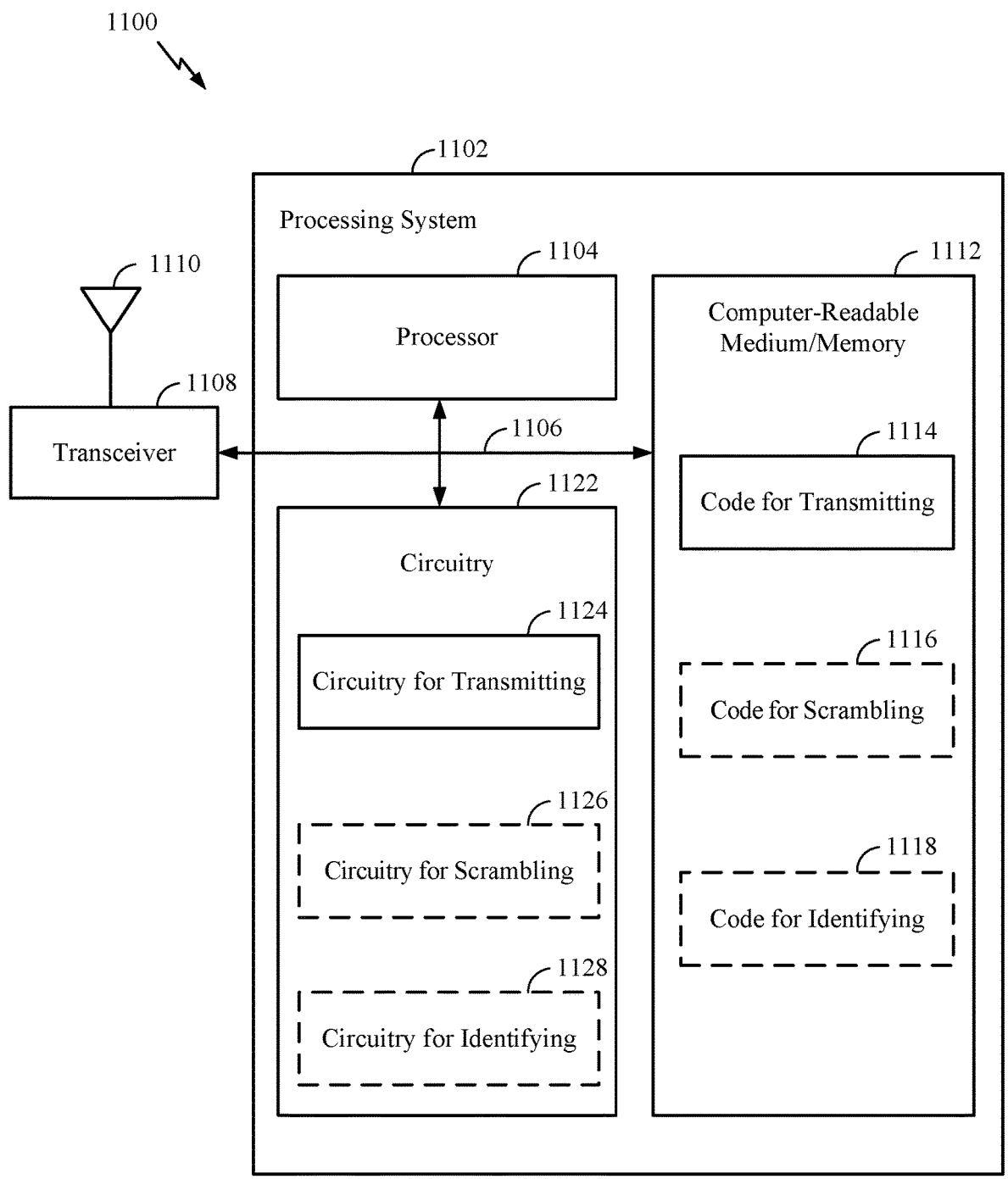
FIG. 11 illustrates a communications device (e.g., a BS) that may include various components configured to perform operations for the techniques disclosed herein in accordance with aspects of the present disclosure.

FIG. 11 illustrates a communications device 1100 (e.g., the BS 110) that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for sending sidelink retransmissions. In certain aspects, computer-readable medium/memory 1112 stores code for transmitting 1114, code for scrambling 1116, and/or code for identifying 1118. In certain aspects, the processing system 1102 has circuitry 1122 configured to implement the code stored in the computer-readable medium/memory 1112. In certain aspects, the circuitry 1122 is coupled to the processor 1104 and/or the computer-readable medium/memory 1112 via the bus 1106. For example, the circuitry 1122 includes circuitry for transmitting 1124, circuitry for scrambling 1126, and/or circuitry for identifying 1128.

Means for transmitting may comprise an antenna (e.g., the antennas 234a-234t), a transceiver (e.g., the transceivers 232a-232t), a processor (e.g., the controller/processor 240), and/or circuitry for transmitting (e.g., the circuitry for transmitting 1124). Means for scrambling may comprise an antenna (e.g., the antennas 234a-234t), a transceiver (e.g., the transceivers 232a-232t), a processor (e.g., the controller/processor 240), and/or circuitry for scrambling (e.g., the circuitry for scrambling 1126). Means for identifying may include an antenna (e.g., the antennas 234a-234t), a transceiver (e.g., the transceivers 232a-232t), a processor (e.g., the controller/processor 240), and/or circuitry for identifying (e.g., the circuitry for identifying 1128). In certain aspects, various processors and/or various circuitry may include a circuit, a CPU, a GPU, a DSP, an ASIC, a FPGA or other PLD, discrete gate or transistor logic, discrete hardware components, or any combination thereof designed to perform the functions described herein.

In addition to the examples described above, many examples of specific combinations are within the scope of the disclosure, some of which are detailed below:

Example 1

A method of wireless communication by a first UE, comprising receiving, from a base station, a first data transmission; receiving, from the base station, a signal indicating to retransmit at least a portion of the first data transmission to a second UE; and transmitting, to the second UE, based at least in part on the signal, a second data transmission via one or more resources, the second data transmission comprising at least the portion of the first data transmission.

Example 2

The method of example 1, wherein the signal comprises a group PDCCH message for a group of UEs including the first UE.

Example 3

The method of examples 1 or 2, wherein the signal further indicates at least one of a UE ID of the first UE in the group of UEs, or a resource allocation indicating the one or more resources.

Example 4

The method of example 3, wherein the signal further indicates at least one of a MCS for the second data transmission, a RV for the second data transmission, a power control command for the second data transmission, or a combination thereof.

Example 5

The method of examples 1-4, further comprising: decoding the signal based on a Group-RNTI, wherein the signal is scrambled with the Group-RNTI associated with a group of UEs including the first UE and the second UE.

Example 6

The method of examples 1-5, further comprising configuring the one or more resources for the second data transmission.

Example 7

The method of examples 1-7, further comprising transmitting, to the second UE, a control message indicating scheduling information for the second data transmission.

Example 8

The method of example 7, wherein transmitting the control message comprises transmitting the control message via a PSCCH.

Example 9

The method of examples 7 or 8, wherein the control message further indicates at least one of: a sidelink ID associated with the second data transmission, a resource allocation indicating the one or more resources, a MCS for the second data transmission, a RV for the second data transmission, a power control command for the second data transmission, or a combination thereof.

Example 10

The method of example 9, wherein the sidelink ID is specific to the second UE, a sidelink transmission, or the first UE.

Example 11

The method of examples 1-10, wherein receiving the first data transmission comprises receiving the first data transmission according to a configuration of one or more SPS resources for a group of UEs including the first UE and the second UE.

Example 12

The method of example 11, further comprising storing the first data transmission in response to receiving the first data transmission via the SPS resources.

Example 13

A method of wireless communication by a second UE, comprising receiving, from a base station or a first UE, a signal indicating scheduling information for a data retransmission; and receiving, from the first UE, the data retransmission via one or more resources.

Example 14

The method of example 13, wherein receiving the signal comprises receiving the signal, from the base station, via a group PDCCH message for a group of UEs including the second UE.

Example 15

The method of examples 13 or 14, wherein the signal further indicates at least one of: a UE ID of the first UE in the group of UEs, a resource allocation indicating the one or more resources, a MCS for the data retransmission, a RV for the data retransmission, a power control command for the data retransmission, or a combination thereof.

Example 16

The method of examples 13-15, further comprising: decoding the signal based on a Group-RNTI, wherein the signal is scrambled with the Group-RNTI associated with a group of UEs including the first UE and the second UE.

Example 17

The method of examples 13-16, wherein receiving the signal comprises receiving the signal, from the first UE, via a PSCCH.

Example 18

The method of example 17, wherein the signal further indicates at least one of: a sidelink ID associated with the data retransmission, a resource allocation indicating the one or more resources, a MCS for the data retransmission, a RV for the data retransmission, a power control command for the data retransmission, or a combination thereof.

Example 19

The method of example 18, wherein the sidelink ID is specific to the second UE, a sidelink transmission, or the first UE.

Example 20

The method of examples 13-19, further comprising: receiving, from the base station, a first data transmission according to a configuration of one or more SPS resources for a group of UEs including the first UE and the second UE; and wherein the data retransmission is a retransmission of the first data transmission via a PSSCH.

Example 21

A method of wireless communication by a base station, comprising: transmitting data to at least a first UE and a second UE; and transmitting, to the first UE, a signal indicating to retransmit at least a portion of the data to the second UE, based on identifying that the second UE failed to successfully decode the data.

Example 22

The method of example 21, wherein the signal comprises a group PDCCH message for a group of UEs including the first UE.

Example 23

The method of examples 21 or 22, wherein the signal further indicates at least one of: a UE ID of the first UE in the group of UEs, a resource allocation indicating one or more resource for the retransmission of the data, a MCS for the retransmission of the data, a RV for the retransmission of the data, a power control command for the retransmission of the data, or a combination thereof.

Example 24

The method of examples 21-23, further comprising scrambling the signal based on a Group-RNTI associated with a group of UEs including the first UE and the second UE.

Example 25

The method of examples 21-24, wherein transmitting the data comprises transmitting the data according to a configuration of one or more SPS resources for a group of UEs including the first UE and the second UE.

Example 26

An apparatus for wireless communication, comprising: a receiver configured to: receive, from a base station, a first data transmission, and receive, from the base station, a signal indicating to retransmit at least a portion of the first data transmission to a UE; and a transmitter configured to transmit, to the UE, based at least in part on the signal, a second data transmission via one or more resources, the second data transmission comprising at least the portion of the first data transmission.

Example 27

The apparatus of example 26, wherein the signal comprises a group PDCCH message for a group of UEs including the apparatus.

Example 28

The apparatus of examples 26 or 27, wherein the signal further indicates at least one of: a UE ID of the first UE in the group of UEs, a resource allocation indicating the one or more resources, a MCS for the second data transmission, a RV for the second data transmission, a power control command for the second data transmission, or a combination thereof.

Example 29

The apparatus of examples 26-28, wherein the receiver is configured to receive the first data transmission according to a configuration of one or more SPS resources for a group of UEs including the apparatus and the second UE.

Example 30

The apparatus of example 29, further comprising: a memory; and a processor coupled to the memory, the processor and the memory configured to store the first data transmission in response to receiving the first data transmission via the SPS resources.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7, FIG. 8, and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a first user equipment (UE), comprising:
    receiving, from a network entity, a first data transmission for a group of UEs, including the first UE and a second UE;
    receiving, from the network entity after receiving the first data transmission, a signal indicating to retransmit at least a portion of the first data transmission to the second UE;
    transmitting, to the second UE in response to receiving the signal indicating to retransmit at least the portion of the first data transmission to the second UE, a control message for the retransmission, the control message indicating scheduling information associated with a plurality of second data transmissions that each include at least the portion of the first data transmission; and
    transmitting the plurality of second data transmissions to the second UE in accordance with the scheduling information.

2. The method of claim 1, wherein the signal comprises a group physical downlink control channel (PDCCH) message for the group of UEs.

3. The method of claim 2, wherein the signal further indicates at least one of:
a UE identifier (ID) of the first UE in the group of UEs.

4. The method of claim 3, wherein the signal further indicates at least one of:
a modulation and coding scheme (MCS) for the plurality of second data transmissions,
a redundancy version (RV) for the plurality of second data transmissions,
a power control command for the plurality of second data transmissions, or
a combination thereof.

5. The method of claim 1, further comprising:
decoding the signal based on a group radio network temporary identifier (Group-RNTI); and
wherein the signal is scrambled with the Group-RNTI associated with the group of UEs including the first UE and the second UE.

6. The method of claim 1, further comprising configuring one or more resources for the plurality of second data transmissions.

7. The method of claim 1, wherein transmitting the control message comprises transmitting the control message via a physical sidelink control channel (PSCCH).

8. The method of claim 1, wherein the control message further indicates at least one of:
a sidelink identifier (ID) associated with the plurality of second data transmissions,
a resource allocation indicating one or more resources for the plurality of second data transmissions,
a modulation and coding scheme (MCS) for the plurality of second data transmissions,
a redundancy version (RV) for the plurality of second data transmissions,
a power control command for the plurality of second data transmissions, or
a combination thereof.

9. The method of claim 8, wherein the sidelink ID is specific to the second UE, a sidelink transmission, or the first UE.

10. The method of claim 1, wherein receiving the first data transmission comprises receiving the first data transmission according to a configuration of one or more semi-persistent scheduling (SPS) resources for the group of UEs.

11. The method of claim 10, further comprising storing the first data transmission in response to receiving the first data transmission via the one or more SPS resources.

12. The method of claim 1, wherein the signal includes a group sidelink radio network temporary identifier (G-SL-RNTI), and the method further comprises determining the second UE from the group of UEs and the portion of the first data transmission for retransmission to the second UE based on the G-SL-RNTI.

13. A method of wireless communication by a second user equipment (UE), comprising:
receiving, from a first UE after a first data transmission, in response to a signal from a network entity comprising an indication to retransmit at least a portion of the first data transmission, a control message for the retransmission, the control message indicating scheduling information associated with a plurality of data retransmissions that each include at least the portion of the first data transmission; and
receiving, from the first UE, the plurality of data retransmissions in accordance with the scheduling information.

14. The method of claim 13, further comprising receiving a second signal indicating the scheduling information, from the network entity, via a group physical downlink control channel (PDCCH) message for a group of UEs including the second UE.

15. The method of claim 14, wherein the second signal further indicates at least one of:
a UE identifier (ID) of the first UE in the group of UEs,
a resource allocation indicating one or more resources for the plurality of data retransmissions,
a modulation and coding scheme (MCS) for the plurality of data retransmissions,
a redundancy version (RV) for the plurality of data retransmissions,
a power control command for the plurality of data retransmissions, or
a combination thereof.

16. The method of claim 14, further comprising:
decoding the second signal based on a group radio network temporary identifier (Group-RNTI),
wherein the second signal is scrambled with the Group-RNTI associated with the group of UEs including the first UE and the second UE.

17. The method of claim 13, wherein receiving the control message comprises receiving the control message, from the first UE, via a physical sidelink control channel (PSCCH).

18. The method of claim 17, wherein the control message further indicates at least one of:
a sidelink identifier (ID) associated with the plurality of data retransmissions,
a resource allocation indicating one or more resources,
a modulation and coding scheme (MCS) for the plurality of data retransmissions,
a redundancy version (RV) for the plurality of data retransmissions,
a power control command for the plurality of data retransmissions, or
a combination thereof.

19. The method of claim 18, wherein the sidelink ID is specific to the second UE, a sidelink transmission, or the first UE.

20. The method of claim 13, further comprising:
receiving, from the network entity, the first data transmission according to a configuration of one or more semi-persistent scheduling (SPS) resources for a group of UEs including the first UE and the second UE; and
wherein the plurality of data retransmissions comprise retransmissions of the first data transmission via a physical sidelink shared channel (PSSCH).

21. A method of wireless communication by a network entity, comprising:
transmitting data to at least a first user equipment (UE) and a second UE; and
transmitting, to the first UE after transmitting the data, a signal indicating to perform a plurality of retransmissions that each include at least a portion of the data to the second UE, based on identifying that the second UE failed to successfully decode the data, wherein the signal further indicates a UE identifier (ID) of the first UE for the plurality of retransmissions of the data, wherein the signal indicates to the first UE to transmit a control message for the retransmissions, the control message indicating scheduling information associated with the plurality of retransmissions of at least the portion of the data to the second UE.

22. The method of claim 21, wherein the signal comprises a group physical downlink control channel (PDCCH) message for a group of UEs including the first UE.

23. The method of claim 22, wherein the signal further indicates at least one of:
   a resource allocation indicating one or more resource for the plurality of retransmissions,
   a modulation and coding scheme (MCS) for the plurality of retransmissions,
   a redundancy version (RV) for the plurality of retransmissions,
   a power control command for the plurality of retransmissions, or
   a combination thereof.

24. The method of claim 21, further comprising scrambling the signal based on a group radio network temporary identifier (Group-RNTI) associated with a group of UEs including the first UE and the second UE.

25. The method of claim 21, wherein transmitting the data comprises transmitting the data according to a configuration of one or more semi-persistent scheduling (SPS) resources for a group of UEs including the first UE and the second UE.

26. An apparatus for wireless communication by a first user equipment (UE), comprising:
   one or more processors individually or collectively configured to execute instructions stored on one or more memories and to cause the first UE to:
      receive, from a network entity, a first data transmission for a group of UEs, including the first UE and a second UE;
      receive, from the network entity after receiving the first data transmission, a signal indicating to retransmit at least a portion of the first data transmission to the second UE;
      transmit, to the second UE in response to receiving the signal indicating to retransmit at least the portion of the first data transmission to the second UE, a control message for the retransmission, the control message indicating scheduling information associated with a plurality of second data transmissions that each include at least the portion of the first data transmission; and
      transmit the plurality of second data transmissions to the second UE in accordance with the scheduling information.

27. The apparatus of claim 26, wherein the signal comprises a group physical downlink control channel (PDCCH) message for the group of UEs including the first UE.

28. The apparatus of claim 27, wherein the signal further indicates at least one of:
   a UE identifier (ID) of the first UE in the group of UEs,
   a modulation and coding scheme (MCS) for the plurality of second data transmissions,
   a redundancy version (RV) for the plurality of second data transmissions,
   a power control command for the plurality of second data transmissions, or
   a combination thereof.

29. The apparatus of claim 26, wherein the one or more processors are further configured to cause the first UE to receive the first data transmission according to a configuration of one or more semi-persistent scheduling (SPS) resources for the group of UEs, including the first UE and the second UE.

30. The apparatus of claim 29, wherein the one or more processors are further configured to cause the first UE to store the first data transmission in response to receiving the first data transmission via the one or more SPS resources.

* * * * *